(12) United States Patent
Nanzer

(10) Patent No.: US 11,536,828 B2
(45) Date of Patent: Dec. 27, 2022

(54) METHODS AND SYSTEMS FOR DISTRIBUTED RADAR IMAGING

(71) Applicant: Board of Trustees of Michigan State University, East Lansing, MI (US)

(72) Inventor: Jeffrey Nanzer, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 117 days.

(21) Appl. No.: 16/970,243

(22) PCT Filed: Feb. 21, 2019

(86) PCT No.: PCT/US2019/018958
§ 371 (c)(1),
(2) Date: Aug. 14, 2020

(87) PCT Pub. No.: WO2020/036629
PCT Pub. Date: Feb. 20, 2020

(65) Prior Publication Data
US 2020/0408899 A1 Dec. 31, 2020

Related U.S. Application Data

(60) Provisional application No. 62/633,179, filed on Feb. 21, 2018.

(51) Int. Cl.
*G01S 13/89* (2006.01)
*G01S 13/34* (2006.01)
(Continued)

(52) U.S. Cl.
CPC ............. *G01S 13/89* (2013.01); *G01S 13/34* (2013.01); *G01S 13/887* (2013.01); *G01S 13/931* (2013.01); *G01S 2013/468* (2013.01)

(58) Field of Classification Search
CPC ........ G01S 13/89; G01S 13/34; G01S 13/887; G01S 13/931; G01S 2013/468; G01S 13/46; G01S 13/878; G01S 13/933
See application file for complete search history.

(56) References Cited

U.S. PATENT DOCUMENTS 6,822,604 B2 * 11/2004 Hall ..................... G01S 13/04
342/21
7,248,204 B2 7/2007 Lovberg et al.
(Continued)

OTHER PUBLICATIONS

Jeffrey A. Nanzer, "Millimeter-wave interferometric imaging sensors," SENSORS, 2013 IEEE, 2013, pp. 1-4, doi: 10.1109/ICSENS.2013.6688267. (Year: 2013).*
(Continued)

*Primary Examiner* — Bernarr E Gregory
*Assistant Examiner* — Yonghong Li
(74) *Attorney, Agent, or Firm* — Harness, Dickey & Pierce PLC

(57) ABSTRACT

An imaging system including a transmitter configured to transmit a signal in a direction of a scene of interest. The transmitted signal is spatially and temporally incoherent at a point where the transmitted signal reaches the scene of interest. The system includes a receiver set including at least a first receiver and a second receiver. The first receiver and the second receiver are configured to receive a reflected signal. The reflected signal is a reflection of the transmitted signal from the scene of interest. The system further includes an active incoherent millimeter-wave image processor configured to obtain the reflected signal and reconstruct a scene based on the reflected signal. The system also includes a display device configured to display the scene.

20 Claims, 7 Drawing Sheets

(51) Int. Cl.
  *G01S 13/88*  (2006.01)
  *G01S 13/931*  (2020.01)
  *G01S 13/46*  (2006.01)

(56) References Cited

U.S. PATENT DOCUMENTS

| | | | |
|---|---|---|---|
| 8,305,255 | B2 | 11/2012 | Margomenos |
| 10,502,826 | B2* | 12/2019 | Tasovac ................ G01S 13/878 |
| 2002/0130807 | A1 | 9/2002 | Hall et al. |
| 2006/0006322 | A1 | 1/2006 | Vaidya |
| 2009/0289833 | A1* | 11/2009 | Johnson ............... H01Q 21/061 |
| | | | 342/179 |
| 2011/0102233 | A1 | 5/2011 | Johnson |
| 2011/0241699 | A1 | 10/2011 | Itsuji |
| 2011/0273320 | A1 | 11/2011 | Nogueira-Nine |
| 2013/0022237 | A1 | 1/2013 | Kuznetsov et al. |
| 2015/0219437 | A1 | 8/2015 | Dowski et al. |
| 2015/0293221 | A1* | 10/2015 | Ahmed ................... G01S 13/89 |
| | | | 342/179 |
| 2017/0103549 | A1 | 4/2017 | Cherubini et al. |

OTHER PUBLICATIONS

International Search Report and Written Opinion dated Feb. 4, 2020 in International Patent Application No. PCT/US2019/018958.
International Preliminary Report on Patentability dated Aug. 27, 2020 in International Patent Application No. PCT/US2019/018958.

\* cited by examiner

METHODS AND SYSTEMS FOR DISTRIBUTED RADAR IMAGING

CROSS-REFERENCE TO RELATED APPLICATIONS

This application is a 371 U.S. National Phase of International Patent Application No. PCT/US2019/018958, filed on Feb. 21, 2019, which claims the benefit of U.S. Provisional Application No. 62/633,179, filed Feb. 21, 2018. The entire disclosures of the applications referenced above are incorporated by reference.

STATEMENT REGARDING FEDERALLY SPONSORED RESEARCH OR DEVELOPMENT

This invention was made with government support under 1708820 awarded by The National Science Foundation. The government has certain rights in the invention.

FIELD

The present disclosure relates to imaging a scene and, more particularly, using an active incoherent millimeter-wave imaging system to image a scene.

BACKGROUND

Electromagnetic imaging sensors operating in the millimeter-wave (mm-wave) band are a solution for a variety of current and emerging applications, including autonomous vehicle navigation, contraband detection, helicopter landing assist, medical imaging, and other general imaging techniques. The mm-wave band is typically understood to range from 30 GHz to 300 GHz. Electromagnetic imaging sensors can generate two-dimensional representations of objects, allowing for the automated extraction of information through traditional image processing techniques. Due to the short wavelengths associated with mm-wave radiation, imaging systems operating within this band provide sufficient spatial resolution to produce images which are recognizable by humans.

Moreover, materials which are opaque to radiation in the infrared and visible portion of the electromagnetic spectrum, such as clothing, limited building materials, smoke, and fog, are effectively transparent to mm-wave propagation. Obviating potentially obstructive materials when imaging offers tremendous value for the aforementioned applications, enabling all weather sensing of the environment surrounding a vehicle for autonomous navigation, as well as empowering through-material sensing for security applications, such as contraband detection.

Electromagnetic imaging sensors are classified as either active or passive. An imaging sensor is active when the sensor first transmits a signal and then measures the corresponding reflection and passive when the sensor only receives a signal either emitting or reflecting from the object of interest. Imaging sensors are further classified as either scanning or staring. An imaging sensor is scanning when the sensor's field of view is transitioned through the region of interest using mechanical or electrical steering and staring when variations of the sensor's directivity are not required. In steered approaches, mechanical systems offer simplistic implementation at the expense of often infeasible size and power requirements. While electronic steering eliminates the motorization requirement which drives these limitations, along with allowing for the more rapid generation of images, the complexity required to achieve the requisite complex beamforming weights at each module is often excessive.

Additionally, microwave imaging systems are used in many applications, including security sensing and medical imaging, due to the ability of microwave radiation to penetrate materials that otherwise block optical and infrared sensors, including clothing and baggage materials. Recently, there has been interest in using spatial frequency sampling to generate images using a subset of the modules required in a filled microwave phased array. Spatial frequency sampling was developed in radio astronomy to synthesize large antenna apertures using a small number of physical modules, and recent efforts have developed passive interferometric imaging systems based on these techniques and the fact that humans emit incoherent thermal radiation. In the microwave region, the radiated power is proportional to the physical temperature of the source for most sources of interest, thus thermal radiation is of particular utility. However, the thermal power received in the microwave region is exceedingly small, necessitating very high sensitivity receivers.

Imaging capability is critical for automobile safety and for future semi-autonomous and autonomous driving. Light detection and ranging ("LIDAR") systems provide excellent resolution but are severely hindered by obscurants, such as fog, smoke, dust, which render them unusable. Further, current automobile radars cannot provide imaging capability. Instead, current automobile radar only provides range, angle and velocity information.

The background description provided here is for the purpose of generally presenting the context of the disclosure and are neither expressly nor impliedly admitted as prior art against the present disclosure.

SUMMARY

An imaging system including a transmitter configured to transmit a signal in a direction of a scene of interest. The transmitted signal is spatially and temporally incoherent at a point where the transmitted signal reaches the scene of interest. The system includes a receiver set including at least a first receiver and a second receiver. The first receiver and the second receiver are configured to receive a reflected signal. The reflected signal is a reflection of the transmitted signal from the scene of interest. The system further includes an active incoherent millimeter-wave image processor configured to obtain the reflected signal and reconstruct a scene based on the reflected signal. The system also includes a display device configured to display the scene.

In other features, the first receiver and the second receiver operate as a correlation interferometer, and the first receiver and the second receiver are phase coherent. In other features, the transmitter is configured to transmit a plurality of signals at predetermined intervals, and the transmitter and the receiver set are mounted on an automotive vehicle. In other features, the receiver set is configured to collect the reflected signal at a first spatial frequency and the first spatial frequency of the reflected signal is based on a distance and an angle between the first receiver and the second receiver. In other features, the system further includes a plurality of receiver sets including the first receiver and the second receiver, where each receiver set of the plurality of receiver sets is configured to receive the reflected signal at a corresponding spatial frequency.

In other features, the active incoherent millimeter-wave image processor constructs the scene using spatial frequency sampling. In other features, the active incoherent millimeter-wave image processor includes a processor with an associated memory configured to store instructions that cause the processor to construct the scene. The instructions include receiving a first voltage output for the first receiver and a second voltage output for the second receiver and normalizing the first voltage output and the second voltage output. The instructions further include correlating the first voltage output and the second voltage output to yield a sample of visibility and performing an inverse Fourier transform of the sample of visibility to produce the scene.

In other features, the transmitted signal has a pseudo-random amplitude and/or a pseudo-random phase. In other features, the transmitted signal is decorrelated to be spatially and temporally incoherent. In other features, the system further includes a plurality of transmitters configured to transmit a plurality of pseudo-noise signals.

An imaging system includes a plurality of modules. Each module of the plurality of modules includes a transmitter configured to transmit a signal in a direction of a scene of interest and a receiver configured to receive a reflected signal. The reflected signal is a reflection of the transmitted signal from the scene of interest and the receiver is operating in a 30 GHZ to 300 GHz band. The system further includes an active incoherent image processing module configured to obtain the reflected signal and generate a reconstructed scene based on the reflected signal. The system also includes a display module configured to display the reconstructed scene.

In other features, each transmitter of the plurality of modules is configured to transmit a plurality of signals at predetermined intervals. In other features, the plurality of modules are mounted along a front bumper of a vehicle and positioned vertically relative to each other from the front bumper to a top of the vehicle. In other features, the plurality of modules are configured in a T-shaped configuration. In other features, plurality of modules are configured in a Y-shaped configuration. In other features, each receiver of each of the plurality of modules is phase locked to a same reference signal.

An active incoherent millimeter-wave imaging method includes transmitting, by a transmitter, a signal in a direction of a scene of interest. The transmitted signal is spatially and temporally incoherent at the scene of interest. The method further includes receiving, by a plurality of receivers, a reflected signal, where the scene of interest reflects the transmitted signal as the reflected signal. Each receiver of the plurality of receivers forms a set with each at least one other receiver of the plurality of receivers and each receiver set is configured to receive the reflected signal at a respective spatial frequency. The method also includes constructing a scene based on the reflected signal using spatial frequency sampling and transmitting the scene to a display screen.

In other features, the transmitting includes transmitting, by the transmitter, a plurality of signals at predetermined intervals. In other features, the transmitted signal has a pseudo-random amplitude and/or a pseudo-random phase. In other features, the transmitted signal is decorrelated to be spatially and temporally incoherent.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

A distributed radar imaging approach can provide similar resolution to that of light detection and ranging ("LIDAR") technology in autonomous vehicles. The distributed radar imaging approach can include active incoherent millimeter-wave ("AIM") imaging. That is, by employing interferometric imaging techniques, AIM imaging can provide equivalent resolution to filled phased arrays using fewer elements or modules, reducing size, cost, and power requirements. Additionally, AIM imaging uses radar signals that propagate through obscurants, such as fog, smoke, and dust with little to no attenuation, making AIM imaging ideal for detection in outdoor environments.

While AIM imaging has been previously employed in passive systems in both astronomy and security applications by imaging the weak intrinsic thermal emissions from the targets of interest, the presently described AIM imaging will leverage a temporally and spatially incoherent active transmission architecture designed to mimic the requisite signal characteristics, for example, incoherence, of thermal emissions. AIM imaging will enhance signal-to-noise ratio at the receiver, reducing bandwidth requirements for a specified sensitivity. Further, use of an active system with transmitted signals enables greater design flexibility and significantly reduces the gain and sensitivity requirements of the receiver.

An antenna array can be mounted on a vehicle and can include a plurality of modules. The antenna array can be a sparse radar array. Each module can include a receiver and a transmitter to image a scene of interest. The transmitters are active transmitters that transmit a transmit signal, which is temporally and spatially incoherent at the scene of interest and illuminates the scene of interest. The transmitted signals reflect off the scene of interest and the receivers receive a reflected signal. The reflected signal is processed, reconstructing the scene of interest using inverse Fourier transforms. Once reconstructed, a display screen can display the reconstructed scene of interest.

In one implementation, the receivers can receive the reflected signals and an AIM image processing module can process the reflected signals. Data from modules of the antenna array can be downlinked to the AIM image processing module for display to an operator of a vehicle.

Figure 1:
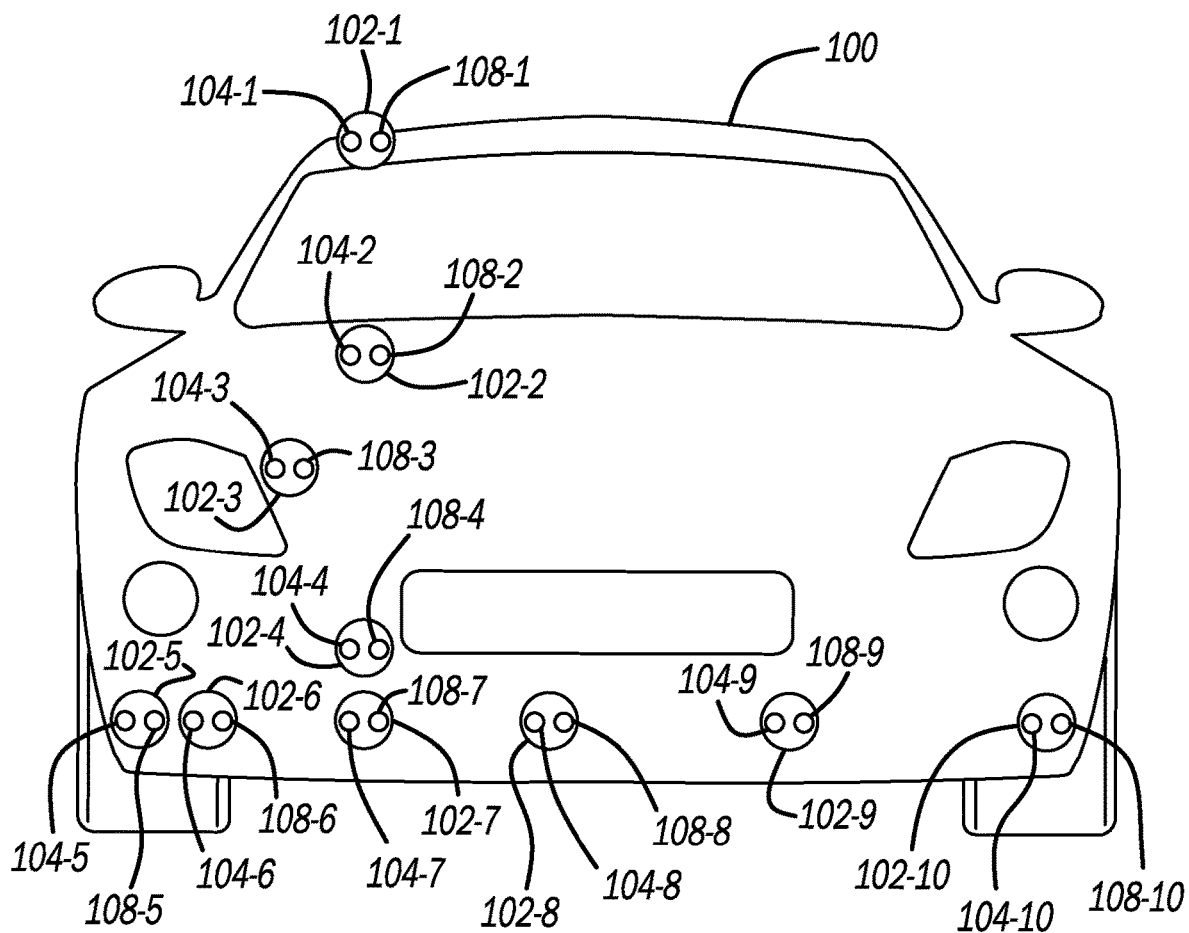
FIG. 1 is a diagrammatic view showing an antenna array layout on a vehicle.

Referring to FIG. 1, a distributed radar imaging system includes an antenna array layout on an automotive passenger vehicle 100 for AIM imaging. An antenna array includes a plurality of modules 102-1, 102-2, 102-3, 102-4, 102-5, 102-6, 102-7, 102-8, 102-9, 102-10, collectively 102.

Each module of the antenna array includes a plurality of receivers 104-1, 104-2, 104-3, 104-4, 104-5, 104-6, 104-7, 104-8, 104-9, 104-10, collectively 104, and a plurality of transmitters 108-1, 108-2, 108-3, 108-4, 108-5, 108-6, 108-7, 108-8, 108-9, 108-10, collectively 108 co-located on each of the modules 102 of the antenna array. The modules 102 of the antenna array are arranged in an inverted T-shaped configuration. Alternatively, the modules 102 could be in a Y-shaped configuration. The antenna array modules 102 are optionally organized in different configurations to accommodate features of the vehicle 100 or other apparatus the modules 120 are mounted on.

For example, in alternative applications, the modules 102 could be mounted on a stand-alone apparatus for imaging an object of interest in a security application or medical imaging application. In security applications, the imaging system may be a contraband detection apparatus. Further, in a medical imaging application, the imaging system may be an imager, such as an x-ray machine. Additionally, the modules 102 would be mounted on the bottom of a helicopter for landing assistance.

The receivers 104 are interferometric array based receivers, for example, correlation interferometers, that are phase locked to the same reference signal or the same clock signal. In other words, the receivers 104 are phase coherent. Additionally, the receivers 104 have sufficient bandwidth to capture a transmitted signal from one of the transmitters 108.

As shown in FIG. 1, the modules 102 of the antenna array, including the plurality of receivers 104 and plurality of transmitters 108, are located along the front bumper of the vehicle 100 and modules 102 are extending vertically from the front bumper to the top of the vehicle 100 where a first module 102-1, a first receiver 104-1, and a first transmitter 108-1 are located. The antenna array may extend upward along a different path of the vehicle 100. Further, in alternative implementations, the antenna array may be attached to a different apparatus. As mentioned above, the antenna array may be mounted on a flat structure for use in security applications, such as contraband detection.

The configuration of the modules 102 can vary to meet quality requirements of the reconstructed image. That is, the desired image quality determines the configuration of the antenna array and placement of the modules 102 as well as the number of modules 102 included in the antenna array. While ten modules are shown in FIG. 1, greater or fewer modules 102 may be included in the antenna array. Moreover, each module does not require both a receiver as well as a transmitter. For example, fewer transmitters than receivers may be used to achieve the desired resolution of a reconstructed image.

The transmitters 108 are active transmitters that capture a snapshot of the scene of interest using pulse signals to retrieve up to date images of scenes of interest. For example, in automotive applications, the scenes of interest include objects in front of the vehicle 100 as well as objects along the sides of the vehicle 100. Alternatively, the transmitted signals could be continuously transmitted and continuously sensed by the receivers 104.

Figure 2:
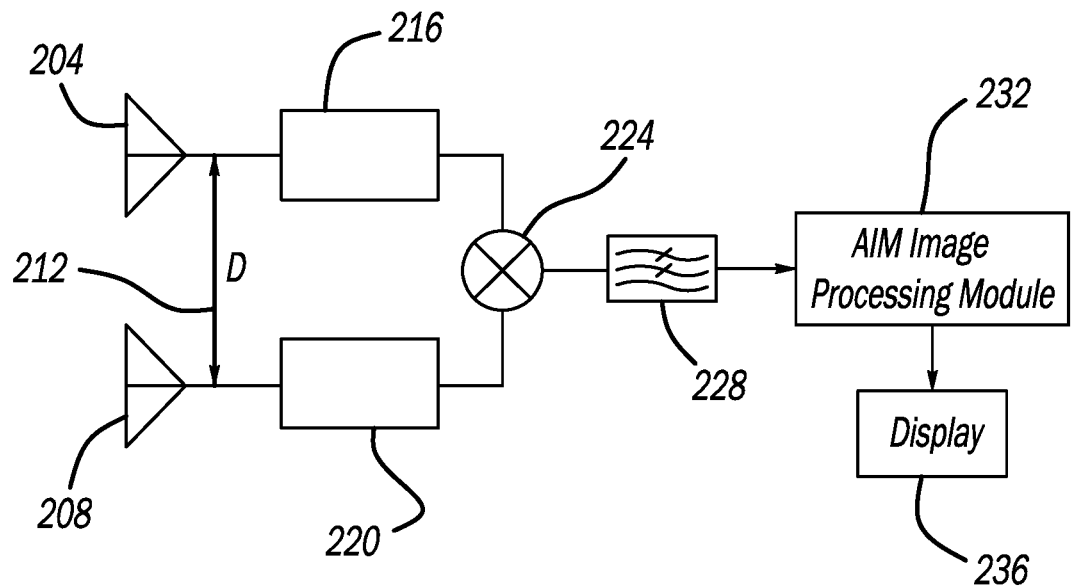
FIG. 2 is a functional block diagram showing a correlation interferometer of the imaging system.

Referring to FIG. 2, a functional block diagram showing a correlation interferometer of the imaging system is shown. In general, to reconstruct the scene of interest on a display screen, AIM imaging uses transmitters 108 of the antenna array to transmit the transmit signal and receivers 104 of the antenna array to receive the reflected signals from the scene of interest. Each receiver of the plurality of receivers 104 is a separation distance from each other receiver. The separation distance as well as the angle between each pair of receivers represents a different spatial frequency of the scene of interest. To reconstruct the image of the scene of interest, an AIM image processing module determines a sampled visibility based on the spatial frequencies calculated from the receiver pairs.

Figure 4:
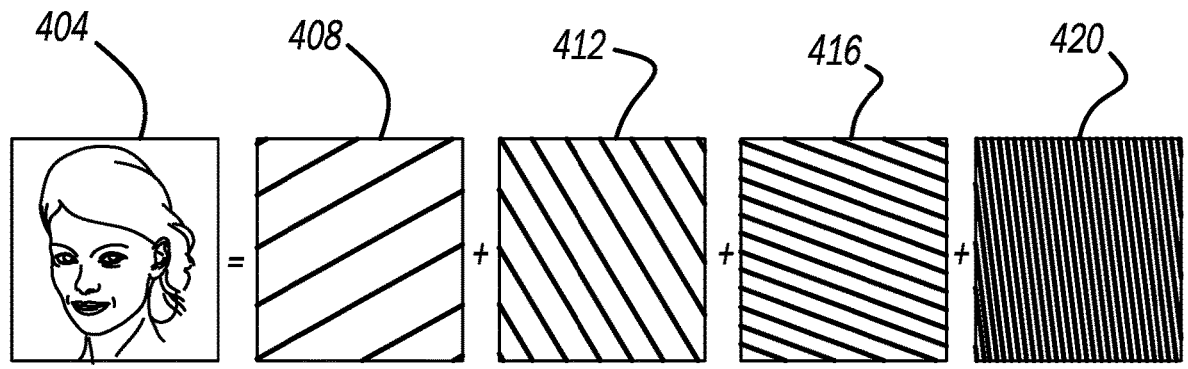
FIG. 4 is a graphical representation of example decomposition of a two-dimensional image into spatial frequency components.

In general, any two-dimensional image, for example, the scene of interest, can be decomposed into a summation of signals corresponding to separate spatial frequencies. The scene of interest is decomposed into separate spatial frequencies, as shown in FIG. 4, by actively transmitting transmit signals from the transmitters 108. The receivers 104 collect the reflected transmit signals at separate spatial frequencies (based on the distance and angle between the receiver pairs) to reconstruct the scene of interest using Fourier analysis techniques. Using multiple pairs of receivers 104 separated by a large number of wavelengths results in more spatial frequencies from which the scene of interest is reconstructed. Because of the constructive and deconstructive interference occurring in the spatial domain, each receiver pair measures a reflected signal at a particular spatial frequency.

In an example implementation, the receivers 104 of the antenna array are correlation interferometers as shown in FIG. 2. The correlation interferometer includes a first antenna 204 and a second antenna 208, representing an antenna pair, separated by a separation distance (D) 212. The first antenna 204 is feeding a first receiver 216 and the second antenna 208 is feeding a second receiver 220. The first receiver 216 and the second receiver 220 represent a receiver pair. As mentioned above, the separation distance 212 between each receiver pair corresponds to a particular spatial frequency.

The correlation interferometer further includes a multiplier 224, an integrator 228, an AIM image processing module 232, and a display 236. The multiplier 224 and integrator 228 may be included in the AIM image processing module 232. That is, the multiplier 224 and integrator 228 functions can be accomplished digitally rather than in analog hardware. The first receiver 216 and the second receiver 220 produce output voltages based on the received signal reflected from the scene of interest. The output voltages are correlated through the multiplier 224 and the integrator 228. The integrator 228 can be a low-pass filter. The correlation interferometer is used to conduct spatial frequency sampling in order to reconstruct the scene of interest based on the received signal reflected from the scene of interest. The correlation interferometer uses spatial frequency sampling to reconstruct the scene of interest.

In a spatial frequency sampling array, each antenna pair 204 and 208 forms a correlation receiver and because both antennas are receiving signals from the same source, located broadside to the correlation interferometer, the voltage outputs of the first receiver 216 and the second receiver 220 is given by:

$$V_1 = s + n_1$$

$$V_2 = s + n_2$$

where s is the voltage due to the antenna temperature (proportional to the source temperature), and $n_i$ is the noise that the i-module receives. After multiplication and integration, the output voltage is:

$$V_{out} = \langle V_1 V_2 \rangle = \langle s^2 \rangle + \langle s_1 n_2 \rangle + \langle s_2 n_1 \rangle + \langle n_1 n_2 \rangle$$

The normalized voltage signals at the antennas 204, 208 can be described as:

$$V_1(t) = \cos(2\lambda ft) + n_1(t)$$

$$V_2(t) = \cos[2\pi f(t - \tau_g)] + n_2(t)$$

where $$\tau_g = \frac{D}{c} \sin\theta$$

is the geometric time delay, which is the time difference the plane wavefront faces in reaching the two receivers. Because the signal voltage is incoherent with the noise components and the noise components are incoherent with each other, the noise components will average to zero as integration time increases. The response of the correlation interferometer at the output of the integrator 228 is given by:

$$r(\tau_g) = \langle V_1 V_2 \rangle = \cos(2\pi ft)\cos[2\pi f(t - \tau_9)]$$

The integrator 228 will cut off the high carrier frequency resulting in the following equation:

$$r(\tau_g) = \frac{1}{2} \cos(kd \sin\theta)$$

All prior work in spatial frequency sampling imaging has taken place with passive systems. The image formation process is conducted using a temporally and spatially incoherent signal emanating from the scene of interest. The Van Cittert-Zernike theorem is valid only in the case where the signal is temporally and spatially incoherent. Therefore, if the transmit signal is temporally and spatially incoherent, the mutual coherence function of a distant, incoherent source is equal to its complex visibility. The thermally generated electromagnetic energy emitted from an object is spatially and temporally incoherent, and by computing the correlation integrals between each receiver pair, for example, 204 and 208, a sample of the source visibility is calculated.

For an active spatial frequency sampling system, the transmitters 108 transmit a signal that is temporally incoherent within the sampling interval, and that is spatially incoherent within the resolution of the receiving array. Temporal and spatial incoherence can be achieved in multiple ways in the transmitter. One approach is to transmit noise-like signals that have random amplitude and phase. However, randomness in only amplitude or phase may be sufficient depending on the application. Alternatively, the signals may not be random, but sufficiently decorrelated to ensure spatial and temporal incoherence.

To reconstruct the scene of interest, after the received signal is received by the receivers 104 (or antenna pairs 204 and 208), the outputs of each antenna pair are correlated, yielding a sample of the visibility. The sample of the visibility is the basic quantity measured by interferometric imaging systems such as the correlation interferometer. Because of the fact that a certain spatial frequency may correspond to more than one antenna pair, the redundant ones can be omitted. The inverse Fourier transform of the reconstructed visibility is the reconstructed scene in the spatial domain. In other words, pairwise correlations formed from measurements using a correlation interferometer are used to estimate the distribution of received energy in the spatial frequency domain.

As noted above, the transmit signal from the transmitters 108 of FIG. 1 are spatially and temporally incoherent when the transmit signal is on the scene of interest. Therefore, at every point in time and space, the transmit signal is uncorrelated from every other point in time and space. To accomplish spatially and temporally incoherent transmit signals, the transmitters 108 can transmit actual noise signals. Alternatively, the transmitters 108 can transmit pseudo-noise signals, random noise sequences, or independent frequencies. That is, in one implementation, the transmit signal can be identical and, once on the scene of interest, the transmit signals are incoherent. That is, once on the scene of interest, every point of one of the transmit signals is uncorrelated from every other point in time and space of every other transmit signal.

The AIM image processing module 232 receives the output from the integrator 228. In another implementation, the multiplier 224 and the integrator 228 can be included in the AIM image processing module 232. The AIM image processing module 232 can include a controller that has a memory for storing a series of processes as computer-executable instructions and a processor for executing the instructions. The processor can perform various computational steps included in the disclosure. A Fourier analysis program can be stored in a memory of the AIM image processing module 232 and executed by the processor. The memory can be a memory circuit that is a non-transitory computer-readable medium.

Once the output is received, the AIM image processing module 232 reconstructs the scene of interest through Fourier analysis. The reconstructed image is then displayed on the display 236. The display 236 can be a screen included in the vehicle 100. For example, the display 236 can be included in a center stack of the vehicle 100. Alternatively, the display 236 may be a screen of a monitoring system for detecting concealed contraband. The display 236 can be, for example, a screen such as that of a phone or a tablet. Alternatively, in response to reconstructing the scene of interest and identifying an object, instead of displaying the reconstructed scene of interest, the vehicle 100 can provide audible or haptic feedback to a driver of the vehicle 100.

Under the assumption of uncorrelated additive noise in both channels of the first antenna 204 and the second antenna 208, the correlation interferometer architecture of FIG. 2 allows for isolation of the received signal with sufficient integration time using the inherent orthogonality between the transmitted signal and noise components. The sensitivity of the measurement provided by this architecture is inversely proportional to the square root of the receiver's bandwidth. Furthermore, the directivity is determined not only by the individual antenna patterns of each antenna channel, but also the separation distance 212 between antennas 204 and 208, referred to as the baseline, and the bandwidths of the first receiver 216 and the second receiver 220.

Figure 3:
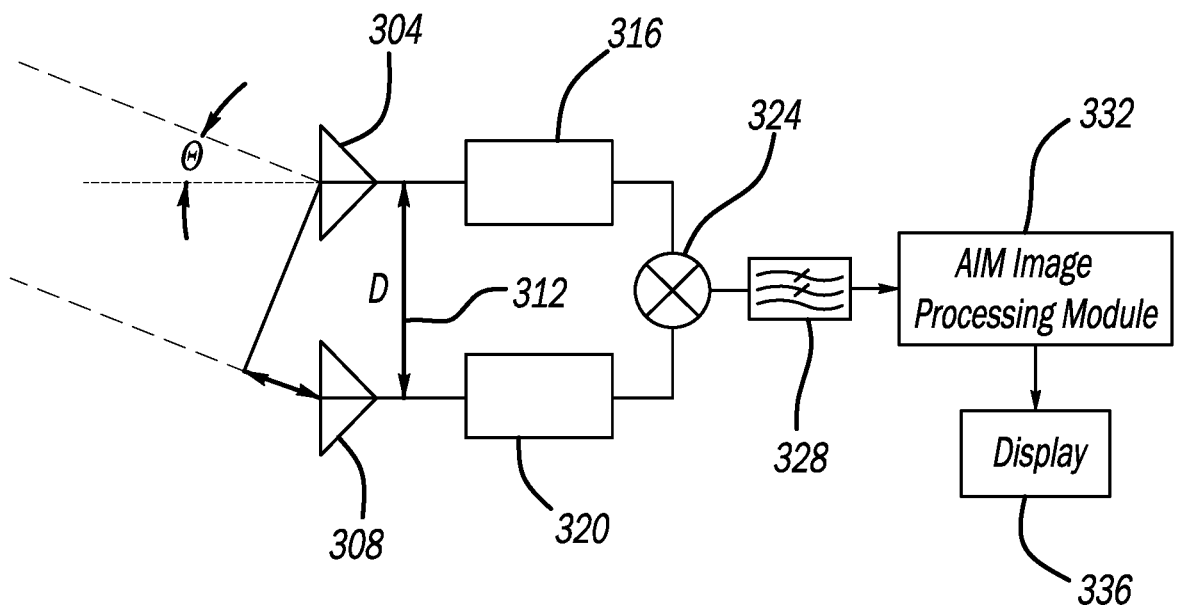
FIG. 3 is a functional block diagram showing a correlation interferometer receiving offset angle signals of the imaging system.

Referring to FIG. 3, a functional block diagram showing a correlation interferometer receiving offset angle signals of the imaging system is shown. The correlation interferometer includes a first antenna 304 and a second antenna 308 separated by a separation distance (D) 312, a first receiver 316, a second receiver 230, a multiplier 324, an integrator 328, an AIM image processing module 332, and a display 336. The multiplier 324 and integrator 328 may be included in the AIM image processing module 332. That is, the multiplier 324 and integrator 328 functions can be accomplished digitally rather than in analog hardware.

The correlation interferometer of FIG. 3 can be implemented as the correlation interferometer of FIG. 2. For signals arriving at the correlation interferometer at some offset angle, for example, 8, from broadside, the marginal propagation required to reach the second antenna 308 allows for angular dependent constructive interference as a function of the separation distance 312.

In FIG. 3, the normalized voltage signals from the first receiver 316 and the second receiver 320 are as follows:

$$V_1(t) = a_1 \cos(2\pi ft) + n_1(t)$$

$$V_2(t) = a_2 \cos[2\pi f(t - \tau_g)] + n_2(t)$$

where $a_1$ is the signal amplitude, and $\tau_g$ is the geometric time delay, which is the time difference between the reception of a plane wavefront at the first antenna 304 and the reception of a plane wavefront at the second antenna 308. One suitable example of correlation interferometer assembly of FIGS. 2 and 3 is discussed in Microwave and Millimeter-wave Remote Sensing for Security Applications by Jeffrey A. Nanzer, published in 2012.

Each receiver 104 shown on the vehicle 100 of FIG. 1 pairs with every other receiver on the vehicle 100 to calculate a spatial frequency response output by the integrator 228 and 328 of FIGS. 2 and 3. Each separation distance 212 and 312 between two receivers and each angle between two receivers produces a different spatial frequency measurement. Therefore, including multiple receivers to pair with every other receiver results in multiple spatial frequency measurements for the AIM image processing modules 232 and 332 to analyze and reconstruct the scene of interest according to Fourier inversion analysis. As mentioned previously, the reconstructed image is displayed on the display 236 and 326.

Referring to FIG. 4, a graphical representation of example decomposition of a two-dimensional image into spatial frequency components is shown. As stated above, in general, any two-dimensional scene can be decomposed into a summation of spatial frequencies. An example scene of interest 404 is a head shot of a person. The example scene of interest 404 is a summation of a first spatial frequency 408, a second spatial frequency 412, a third spatial frequency 416, and a fourth spatial frequency 420.

Each receiver pair samples one spatial frequency. For example, the first antenna 204 and 304 and the second antenna 208 and 308 of FIGS. 2 and 3 are each one receiver pair. Based on the separation distance 212 and 312 and the offset angle θ, one spatial frequency is sampled, for example, the first spatial frequency 408. Then, for every other receiver relationship, another spatial frequency is included in the summation to decompose the example scene of interest 404.

Figure 5:
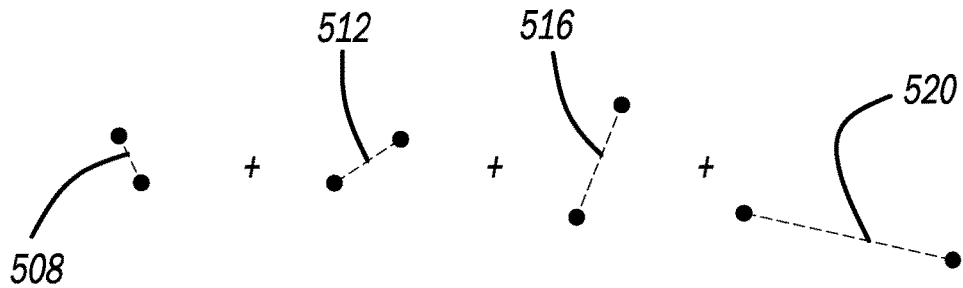
FIG. 5 is a graphical representation of example receiver pairs corresponding to two-dimensional images represented in FIG. 4.

Referring to FIG. 5, a graphical representation of example receiver pairs corresponding to two-dimensional images represented in FIG. 4 is shown. For example, the receiver pairs in FIG. 5 can be mapped to the modules 102 of the antenna array depicted in FIG. 1. A first receiver pair 508 can correspond to a relationship between the receiver 104-4 and the receiver 104-8. A second receiver pair 512 can correspond to a relationship between receiver 104-4 and receiver 104-5. A third receiver pair 516 can correspond to a relationship between receiver 104-2 and receiver 104-5. A fourth receiver pair 520 can correspond to a relationship between 104-4 and 104-10.

Figure 6:
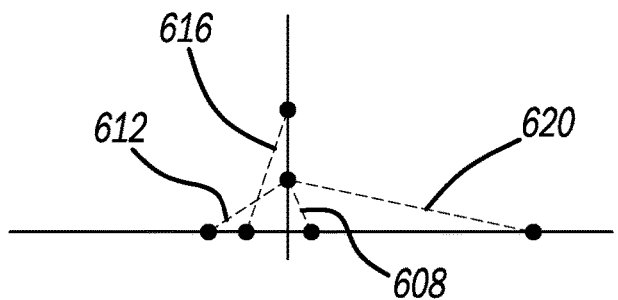
FIG. 6 is a graphical representation of antenna pairs in an antenna array layout of FIG. 1.

FIG. 6 is a graphical representation of receiver pairs in the antenna array layout of FIG. 1. The first receiver pair 508 corresponds to a first graph line 608. The second receiver pair 512 corresponds to a second graph line 612. The third receiver pair 516 corresponds to a third graph line 616. The fourth receiver pair 520 corresponds to a fourth graph line 620. Each point connecting graph lines 608, 612, 616, and 620 represents a module of an example antenna array. For example, as shown in FIG. 6, the antenna array configuration matches the configuration of the vehicle 100 in FIG. 1.

Figure 7:
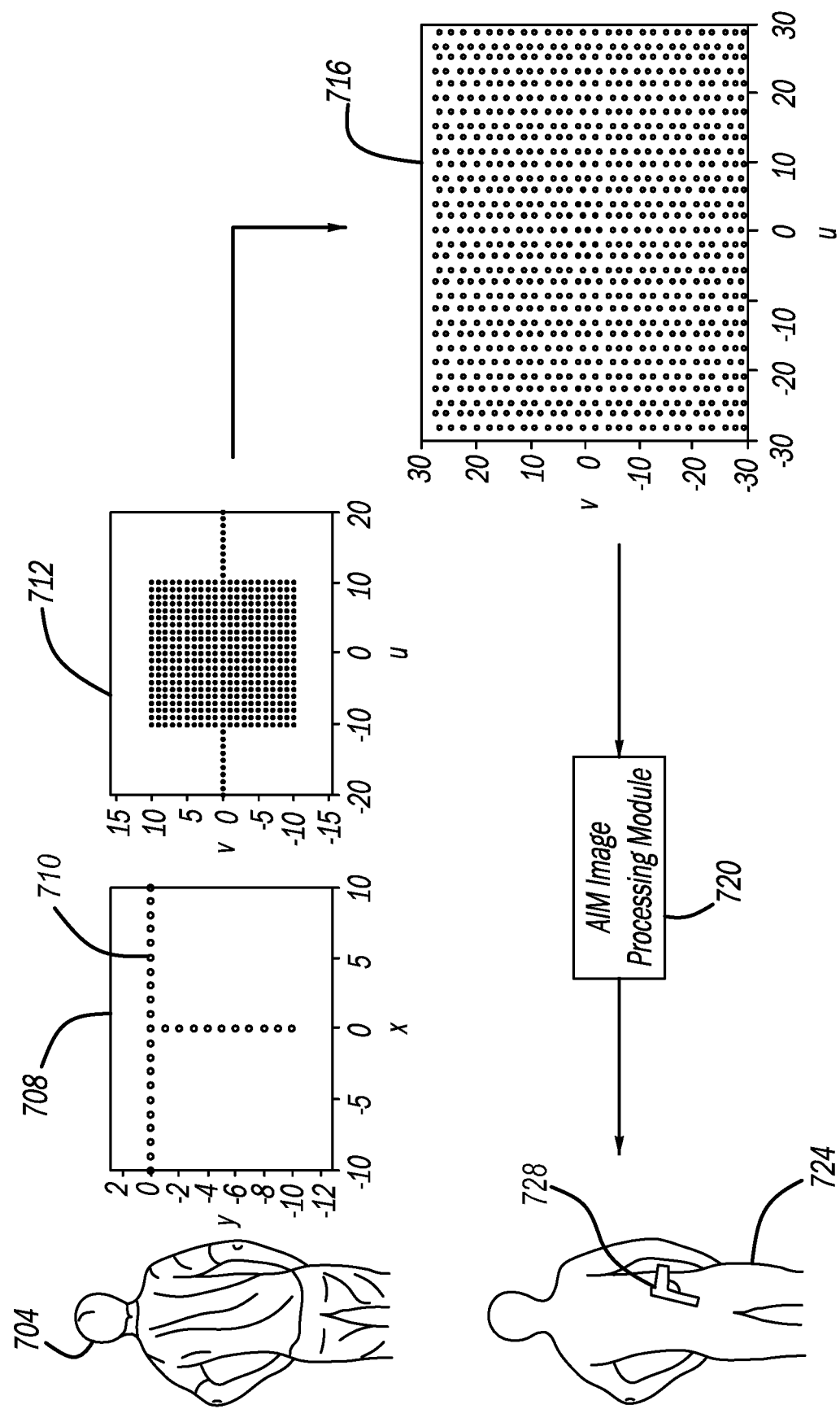
FIG. 7 is a graphical flow representation of distributed imaging of an individual.

Referring to FIG. 7, a graphical flow representation of distributed imaging of an individual 704 is shown. As discussed with respect to the above figures, distributed imaging can be conducted in multiple applications. For example, the antenna array of FIG. 1 can be mounted on the vehicle 100 to image objects in front of the vehicle 100 during all weather conditions, such as fog, dust, etc. Another application is contraband detection. While FIG. 7 is showing a hidden item, the same distributed imaging technique is used in the vehicle 100 as well as on a helicopter for landing assistance and other applications previously discussed.

The individual 704 represents the scene of interest. For example, a 94 GHz mm-wave sensor is used to image a weapon 728 hidden beneath clothing of the individual 704. Alternatively, in automotive applications, a transmitted signal of 77 GHz or greater may be more desirable to capture the scenes of interest. An antenna array 708 can be used to image the scene of interest. As in FIG. 1, each module 710 of the antenna array 708 includes a transmitter and a receiver. A transmit signal sent by the transmitter reflects off the individual 704 and the receiver receives the reflected signals. Each receiver can receive the reflected signal with respect to every other receiver included in the antenna array 708. That is, a spatial frequency is determined for each receiver pair in the antenna array 708.

A Fourier domain sampling function 712 is constructed based on the determined spatial frequencies. For example, the length and angle for each receiver pair corresponds to one point in the Fourier domain sampling function 712. That is, the image of the individual 704 is decomposed into a summation of signals corresponding to separate spatial frequencies in the same way that a voltage waveform in the time domain can be represented by a summation of signals in the frequency domain. The output of each receiver pair is correlated, yielding a sampled visibility 716. The sampled visibility 716 is the basic quantity measured by interferometric imaging systems, such as those depicted in FIGS. 2 and 3.

The sampled visibility 716 is related to the image of the individual 704 via a Fourier transform. As long as each receiver pair measures enough spatial frequencies such that the sampled visibility 716 is adequately sampled, the image of the individual 704 can be reconstructed using Fourier analysis via an AIM imaging processing module 720. A reconstructed image 724 is generated on a screen. The reconstructed image 724 generally depicts the individual 704 of the original scene of interest. Further, for contraband detection purposes and distinguishing between objects in the scene of interest, objects are discernable based on varying temperatures. For example, the reconstructed image 724 reconstructs the image of the individual 704 based on temperatures of the image of the individual 704. Therefore, AIM imaging has contraband detection applications. As shown in the reconstructed image 724, an outline of the weapon 728 is shown on the individual 704 that is not visible in the original image of the individual 704.

Spatial frequency imaging operates on the surface much like a simple digital camera. That is, no beam scanning or moving parts are necessary. However, the image formation process requires cross correlations in signal processing. Moreover, no one pixel of the image corresponds to a signal receiver. Therefore, the failure of one of the modules 710 does not prevent the reconstruction of the reconstructed image 724.

Figure 8A:
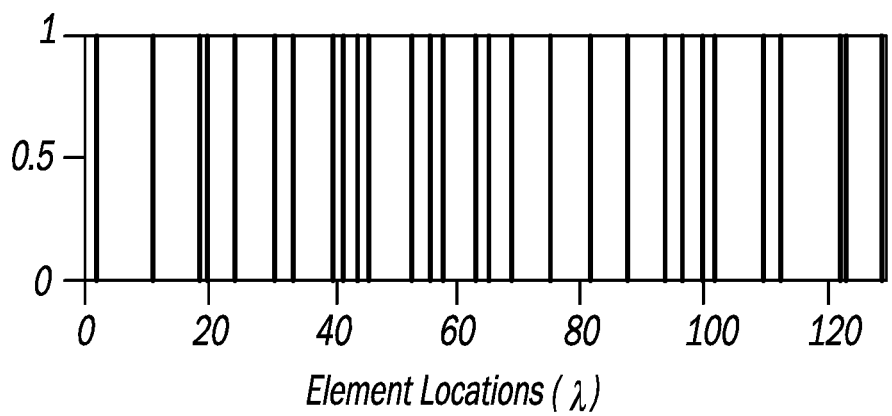
FIG. 8A is a graphical representation of an example implementation of a randomly placed element array.

FIG. 8A illustrates a randomly placed element array. Each element can be a module, such as the modules 710 of the antenna array 708 of FIG. 7. For example, FIG. 8A shows a set of 30 random noise transmitters located in a random one-dimensional array. The 30 random noise transmitters are spaced over a total of about 125 wavelengths. The spacing between adjacent modules was randomized to be up to 30 wavelengths to investigate spatio-temporal transmission and one-dimensional spatial frequency sampling imaging. The antenna array of FIG. 8A represents an 88% reduction in antenna modules to achieve the same spatial resolution. In a two-dimensional implementation, the module number will be further lowered.

Figure 8B:
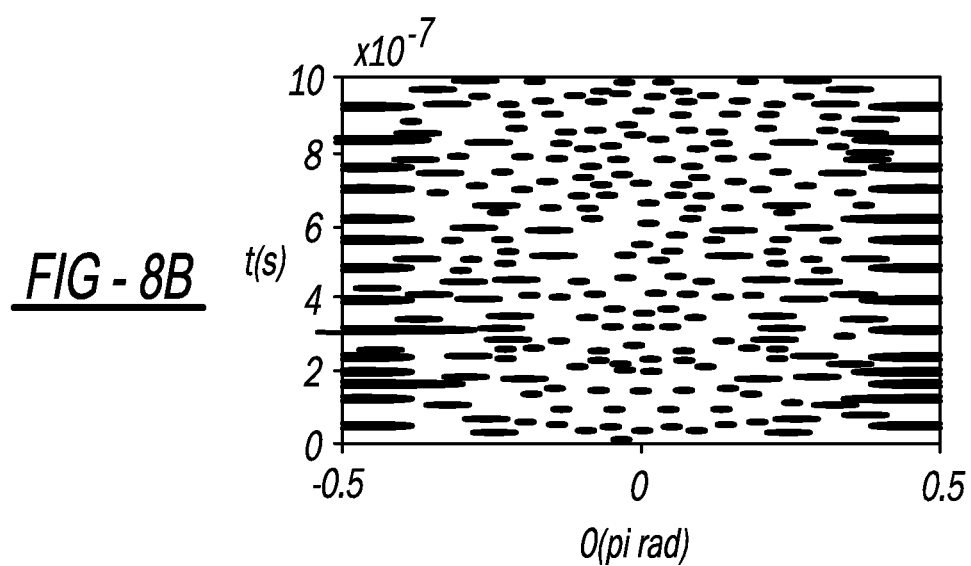
FIG. 8B is a graphical representation of a spatio-temporal transmit pattern with random noise at each array element of FIG. 8A.

As observed in FIG. 8B, spatio-temporal transmit pattern with random noise at each array module of FIG. 8A is employed. FIG. 8B shows the radiation pattern over a space and a time duration of one microsecond with the signals varying at a period of ten microseconds.

Figure 8C:
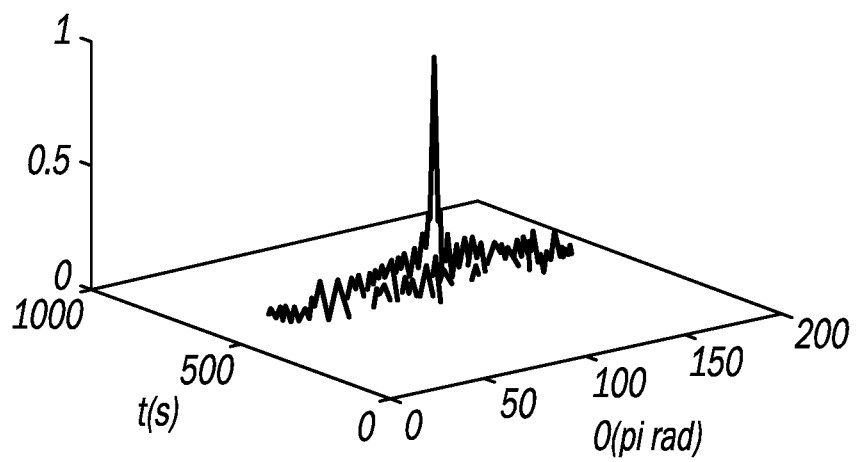
FIG. 8C is a graphical representation of two-dimension autocorrelation of the spatio-temporal transmit pattern of FIG. 8B.

Referring to FIG. 8C, a graphical representation of two-dimension autocorrelation of the spatio-temporal transmit pattern of FIG. 8B is shown. The coherence of the radiated field can be assessed by calculating the two-dimensional autocorrelation in FIG. 8C. FIG. 8C shows the field is strongly coherent based on the strong center peak. As mentioned previously, the field being spatially incoherent between resolutions bins and temporally incoherent between time bins is important. The transmit signals are spatially and temporally incoherent at the point at which the transmit signals reach the scene of interest. That is, at every point in time and space, the transmit signal is uncorrelated from every other point in time and space of other transmit signals when the transmit signal is on the scene of interest.

Figure 9A:
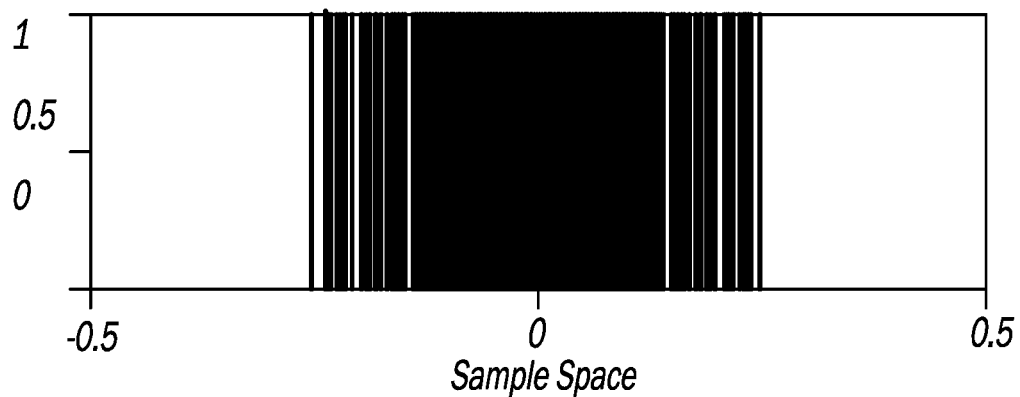
FIG. 9A is a graphical representation of an example sampling function of the randomly placed array of FIG. 8A.

FIG. 9A shows a sampling function of the randomly placed array of FIG. 8A. The antenna locations of FIG. 8A define the spatial frequency sampling function shown in FIG. 9A by the different antenna separations.

Figure 9B:
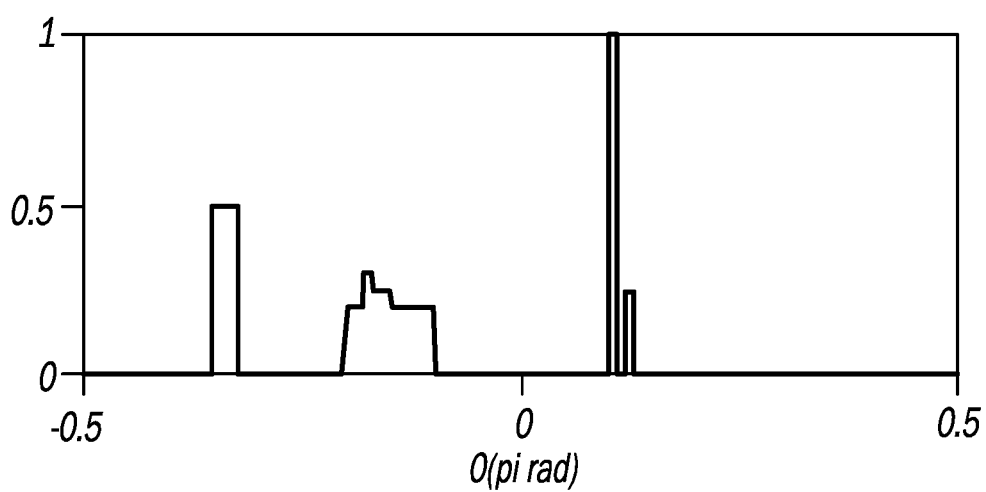
FIG. 9B is a graphical representation of an example imaging scene.

Referring next to FIG. 9B, a one-dimensional imaging scene is provided. To demonstrate the application of the one-dimensional imaging system, a one-dimensional scene (that is, a graph) is used as a scene of interest.

Figure 9C:
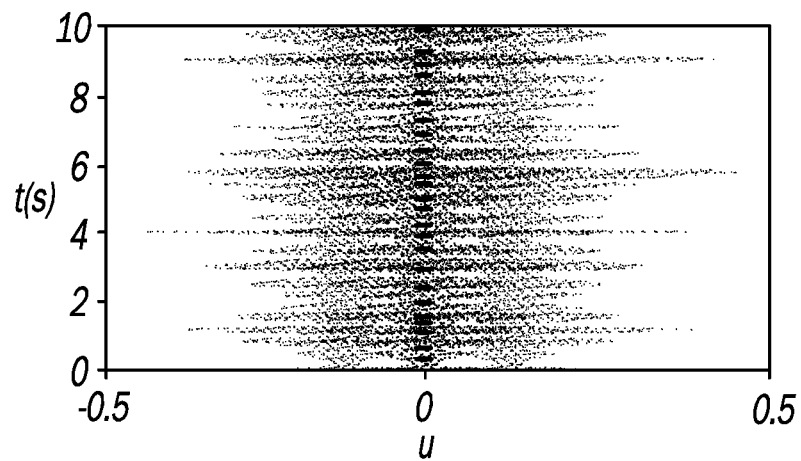
FIG. 9C is a graphical representation of an example spatio-temporal visibility of the example imaging scene of FIG. 9B.

In FIG. 9C, a spatio-temporal visibility of the one-dimensional imaging scene of FIG. 9B is shown. FIG. 9C demonstrates that the majority of information is contained at low spatial frequencies as information is centered near zero. However, the high spatial frequencies contain information needed for spatial resolution. The sampled visibility is the product of the scene visibility and the sampling function of FIG. 9E. The design of the sampling function is important to successfully create images with good spatial resolution.

Figure 9D:
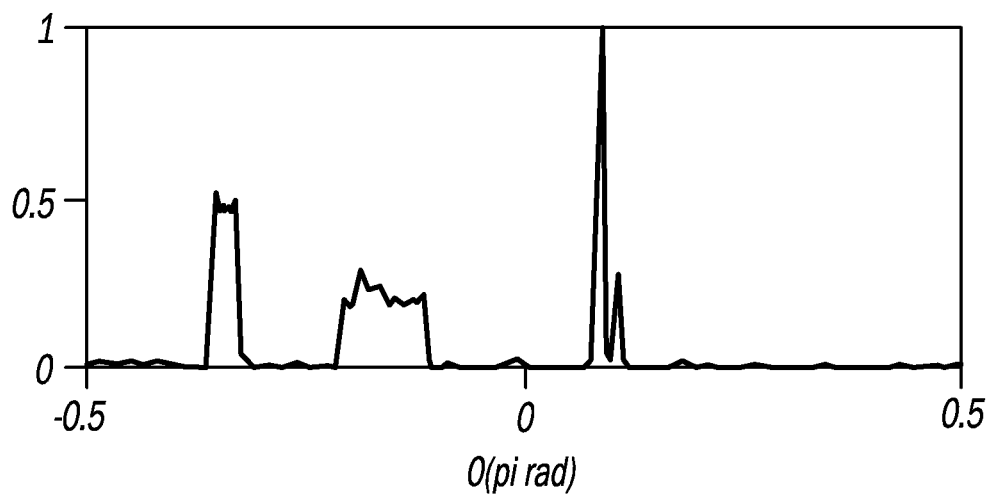
FIG. 9D is a graphical representation of an example reconstructed imaging scene of 9B from the randomly placed array of 8A.

FIG. 9D depicts a reconstructed imaging scene of 9B from the randomly placed array of FIG. 8A. The reconstructed image is integrated over the length of the time duration. As demonstrated, the scene of FIG. 9B is reconstructed in FIG. 9E.

Figure 9E:
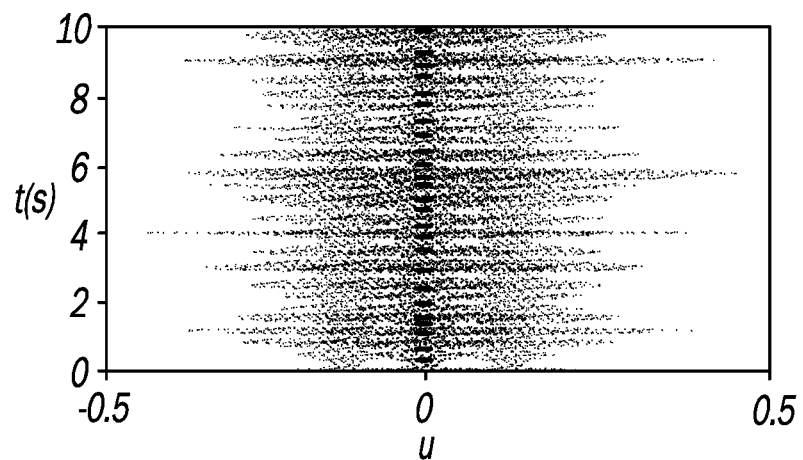
FIG. 9E is a graphical representation of a sampled visibility determined by the product of the sampling function and the scene visibility.

FIG. 9E demonstrates a sampled visibility determined by the product of the sampling function and the scene visibility is shown. The sampled visibility of 9E is an example of the output of each receiver pair being correlated, which, as mentioned with respect to the sampled visibility 716 of FIG. 7, yields a sampled visibility.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. While various embodiments have been disclosed, other variations may be employed. All of the components and function may be interchanged in various combinations, although all of the advantages of the present invention may not be realized with interchanged variants as described herein. It is intended by the following claims to cover these and any other departures from the disclosed embodiments which fall within the true spirit of this invention.

What is claimed is:

1. An imaging system comprising:
   a plurality of transmitters mounted spaced-apart on a structure configured to transmit random or decorrelated signals in a direction of a scene of interest, wherein the transmitted signals are spatially and temporally incoherent where the transmitted signals reach the scene of interest;
   a receiver set including at least a first receiver and a second receiver, the first receiver and the second receiver being configured to receive a reflected signal, wherein the reflected signal is a reflection of the transmitted signals from the scene of interest, and wherein the first receiver and the second receiver are phase locked to a same reference signal;
   an active incoherent millimeter-wave image processor configured to obtain the reflected signal and reconstruct the scene based on the reflected signal; and
   a display device configured to display the scene.

2. The imaging system of claim 1, wherein:
   the first receiver and the second receiver operate as a correlation interferometer; and the first receiver and the second receiver are phase coherent.

3. The imaging system of claim 1, wherein:
the transmitter is configured to transmit a plurality of signals at predetermined intervals; and
the transmitter and the receiver set are mounted on an automotive vehicle.

4. The imaging system of claim 1, wherein:
the receiver set is configured to collect the reflected signal at a first spatial frequency; and
the first spatial frequency of the reflected signal is based on a distance and an angle between the first receiver and the second receiver.

5. The imaging system of claim 1, further comprising a plurality of receiver sets including the first receiver and the second receiver, wherein each receiver set of the plurality of receiver sets is configured to receive the reflected signal at a corresponding spatial frequency.

6. The imaging system of claim 1, wherein the active incoherent millimeter-wave image processor constructs the scene using spatial frequency sampling.

7. The imaging system of claim 1, wherein:
(a) the active incoherent millimeter-wave image processor includes a processor with an associated memory configured to store instructions; and
(b) the instructions cause the processor to construct the scene by:
receiving a first voltage output for the first receiver and a second voltage output for the second receiver;
normalizing the first voltage output and the second voltage output;
correlating the first voltage output and the second voltage output to yield a sample of visibility; and
performing an inverse Fourier transform of the sample of visibility to produce the scene.

8. The imaging system of claim 1, wherein the transmitted signal has a pseudo-random amplitude and a pseudo-random phase.

9. The imaging system of claim 1, wherein the transmitted signal is decorrelated to be spatially and temporally incoherent.

10. The imaging system of claim 1, further comprising a plurality of transmitters configured to transmit a plurality of pseudo-noise signals.

11. An imaging system comprising:
(a) a plurality of modules, wherein each module of the plurality of modules includes:
a plurality of spaced-apart transmitters spaced apart on a structure configured to transmit random or decorrelated signals in a direction of a scene of interest, wherein the transmitted signals are spatially and temporally incoherent where the transmitted signals reach the scene of interest; and
a receiver configured to receive a reflected signal, wherein the reflected signal is a reflection of the transmitted signal from the scene of interest, wherein the receiver is operating in a 30 GHZ to 300 GHz band, and wherein the receiver is phase locked to a same reference signal;
(b) an active incoherent image processing module configured to obtain the reflected signal and generate a reconstructed scene based on the reflected signal; and
(c) a display module configured to display the reconstructed scene.

12. The imaging system of claim 11 wherein each transmitter of the plurality of modules is configured to transmit a plurality of signals at predetermined intervals.

13. The imaging system of claim 11 wherein the plurality of modules are mounted along a front bumper of a vehicle and positioned vertically relative to each other from the front bumper to a top of the vehicle.

14. The imaging system of claim 11 wherein the plurality of modules are configured in a T-shaped configuration.

15. The imaging system of claim 11 wherein the plurality of modules are configured in a Y-shaped configuration.

16. An active incoherent millimeter-wave imaging method comprising:
transmitting, by a plurality of transmitters mounted spaced-apart on a structure, random or decorrelated signals in a direction of a scene of interest, wherein the transmitted signals are spatially and temporally incoherent where the transmitted signals reach the scene of interest;
receiving, by a plurality of receivers, a reflected signal, wherein the scene of interest reflects the transmitted signal as the reflected signal, and wherein each receiver of the plurality of receivers forms a set with each at least one other receiver of the plurality of receivers and each receiver set is configured to receive the reflected signal at a respective spatial frequency, and wherein the plurality of receivers are phase locked to a same reference signal;
constructing a scene based on the reflected signal using spatial frequency sampling; and
transmitting the scene to a display screen.

17. The active incoherent millimeter-wave imaging method of claim 16 wherein the transmitting includes transmitting, by the transmitter, a plurality of signals at predetermined intervals.

18. The active incoherent millimeter-wave imaging method of claim 16 wherein the transmitted signal has a pseudo-random amplitude and a pseudo-random phase.

19. The active incoherent millimeter-wave imaging method of claim 16 wherein the transmitted signal is decorrelated to be spatially and temporally incoherent.

20. The active incoherent millimeter-wave imaging method of claim 16 further comprising:
receiving a first voltage output for a first receiver of the plurality of receivers and a second voltage output for a second receiver of the plurality of receivers;
normalizing the first voltage output and the second voltage output;
correlating the first voltage output and the second voltage output to yield a sample of visibility; and
performing an inverse Fourier transform of the sample of visibility to construct the scene.

* * * * *